(12) United States Patent
Wohlrab

(10) Patent No.: US 6,824,381 B2
(45) Date of Patent: Nov. 30, 2004

(54) ROTARY DEVICE FOR A HORIZONTAL INJECTION MOLDING MACHINE

(75) Inventor: Walter Wohlrab, Weissenburg (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 143 days.

(21) Appl. No.: 10/278,180

(22) Filed: Oct. 22, 2002

(65) Prior Publication Data

US 2003/0077354 A1 Apr. 24, 2003

(30) Foreign Application Priority Data

Oct. 24, 2001 (DE) ........................................ 101 52 394

(51) Int. Cl.[7] ............................................. B29C 45/22
(52) U.S. Cl. ........................................ 425/574; 425/576
(58) Field of Search ............................... 425/574, 575, 425/576

(56) References Cited

U.S. PATENT DOCUMENTS 4,330,257 A * 5/1982 Rees et al. .................. 425/574
6,709,251 B2 * 3/2004 Payette et al. .............. 425/576

FOREIGN PATENT DOCUMENTS

| CH | 3 60 802 | 4/1962 |
| DE | 197 33 667 A1 | 2/1999 |
| EP | 0 249 703 A2 | 12/1987 |
| EP | 0 895 848 A | 2/1999 |
| GB | 2 300 142 A | 10/1996 |
| WO | WO 01/10624 A1 | 2/2001 |

* cited by examiner

Primary Examiner—Tim Heitbrink
(74) Attorney, Agent, or Firm—Henry M. Feiereisen

(57) ABSTRACT

A rotary device for a horizontal injection molding machine is configured in the form of a module frame which includes a base plate and a turntable rotatably mounted on the base plate. Drives are provided to move the base plate in longitudinal direction and to rotate the turntable. A fixed mold mounting plate of the injection molding machine can be mounted on a mounting structure of the module frame, whereas a moveable mold mounting plate is received in guides along the sides of the module frame.

18 Claims, 3 Drawing Sheets

ROTARY DEVICE FOR A HORIZONTAL INJECTION MOLDING MACHINE

CROSS-REFERENCES TO RELATED APPLICATIONS

This application claims the priority of German Patent Application, Serial No. 101 52 394.7, filed Oct. 24, 2001, pursuant to 35 U.S.C. 119(a)–(d), the disclosure of which is incorporated herein by reference.

BACKGROUND OF THE INVENTION

The present invention relates to a rotary device for a horizontal injection machine for turning mold halves or molded articles between the mold mounting plates about a vertical axis. The invention also relates to an injection mold machine equipped with such a rotary device.

A rotary device of this type is described, for example, in International patent application no. WO 01/10624 A1 and includes a base plate and a turntable rotatably mounted on the base plate. The base plate with the attached turntable are mounted on a machine bed of a horizontal injection molding machine and can travel in axial direction between a moveable mold mounting plate and a fixed mold mounting plate. The turntable carries in operation a third mold plate, a so-called swivel plate with mold halves, for interaction with respective mold halves of the moving and fixed mold mounting plates. As the rotary device is mounted in the machine bed of the horizontal injection molding machine, a retrofitting of a standard injection molding machine requires a modification of the other components. This is very complicated and cost-intensive.

It would therefore be desirable and advantageous to provide an improved rotary device for a horizontal injection molding machine to obviate prior art shortcomings and to allow installation in existing machines in an easy and yet reliable manner.

SUMMARY OF THE INVENTION

According to one aspect of the present invention, a rotary device for a horizontal injection molding machine, includes a base plate, a turntable rotatably mounted on the base plate, and a module frame in which the base plate with the turntable are mounted for displacement.

The present invention resolves prior art problems by the provision of a module frame, which can be mounted as a unit onto the machine bed, whereby the moving and the fixed mold mounting plates are secured to the module frame. The module frame includes hereby a mounting structure for attachment of a fixed mold mounting plate and guides for a moveable mold mounting plate.

According to another feature of the present invention, the module frame may have integrated therein a drive mechanism for displacement of the base plate with the attached turntable. The drive mechanism may be configured with hydraulic cylinders, spindles or the like. As an alternative, the drive mechanism may be realized by a rack and pinion structure comprised of a fixed rack securely mounted to the module frame, a moving rack securely mounted to the moveable mold mounting plate, and a pinion connected to the base plate and meshing with the fixed and moving racks. A rack and pinion mechanism of this type is described, for example, in International patent application no. WO 01/10624 A1 and operates in a manner that the moveable mold mounting plate moves the base plate about a distance which corresponds to half the movement path of the moveable mold mounting plate. The rack and pinion mechanism is integrated in the module frame, with the module frame having guides for the moving rack.

The base plate may be configured as massive plate or may be formed with pockets or designed as frame construction (weldment).

Suitably, the module frame includes a fastening assembly for securement to the machine bed of an injection molding machine.

According to one aspect of the present invention, a horizontal injection molding machine includes a machine bed, a first mold mounting plate carrying a mold half, a second mold mounting plate adapted for traveling relative to the first mold mounting plate and carrying another mold half, and a rotary device including a modular frame adapted for placement on the machine bed and having a mounting structure for supporting the first mold mounting plate and a guide for supporting the second mold mounting plate, a base plate supported on the modular frame, and a turntable carrying a swivel plate between the first and second mold mounting plates and supported on the base plate for rotation about a vertical axis so as to turn the swivel plate.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
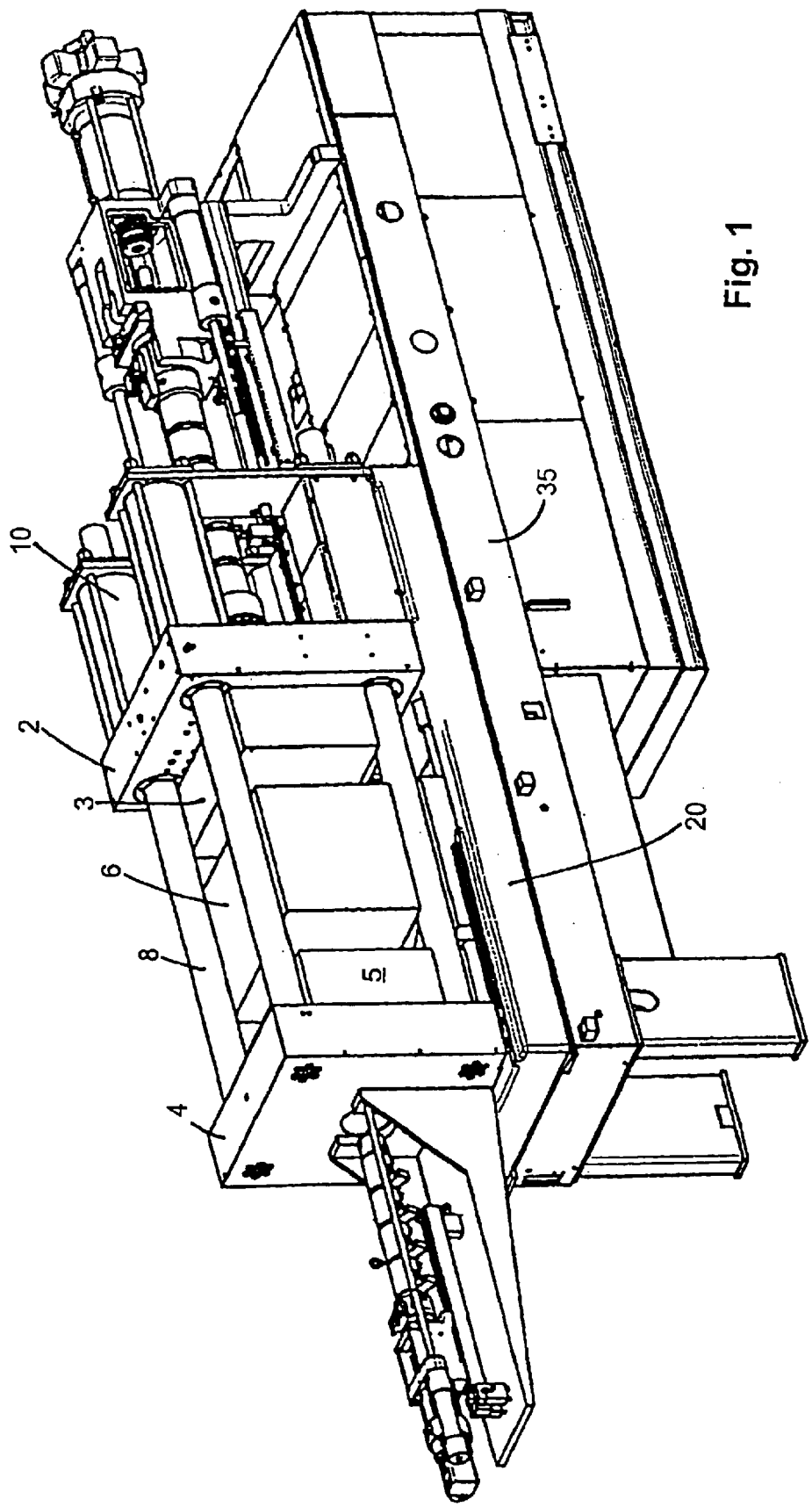
FIG. 1 is a perspective view of an injection molding machine according to the present invention.

Throughout all the Figures, same or corresponding elements are generally indicated by same reference numerals.

Turning now to the drawing, and in particular to FIG. 1, there is shown a perspective view of an injection molding machine according to the present invention, including a fixed mold mounting plate 2, which carries a mold half 3, and a moveable mold mounting plate 4, which carries a mold half 5. Placed between the mold halves 3, 5 is a swivel plate 6. The swivel plate 6 and the mold halves 3, 5 are each provided with, not shown, form recesses in confronting relationship to define respective cavities for injection molding plastic articles. Tie bars 8 extend through the fixed mold mounting plate 2 for connection to the moveable mold mounting plate 4 which can thus be moved in the direction of and away from the fixed mold mounting plate 2. Hydraulic cylinders 10 which form part of a drive mechanism, are shown for movement of the tie bars 8 and thus of the mold mounting plate 4 and injection molding units.

As shown in FIG. 1, the entire construction of drive mechanism and mold mounting plates is mounted on a module frame 20 which can be secured to a machine bed 35 of the injection molding machine, e.g. via plates 23 and bolts 25, and will now be described in more detail with reference to FIGS. 2 to 7.

Figure 2:
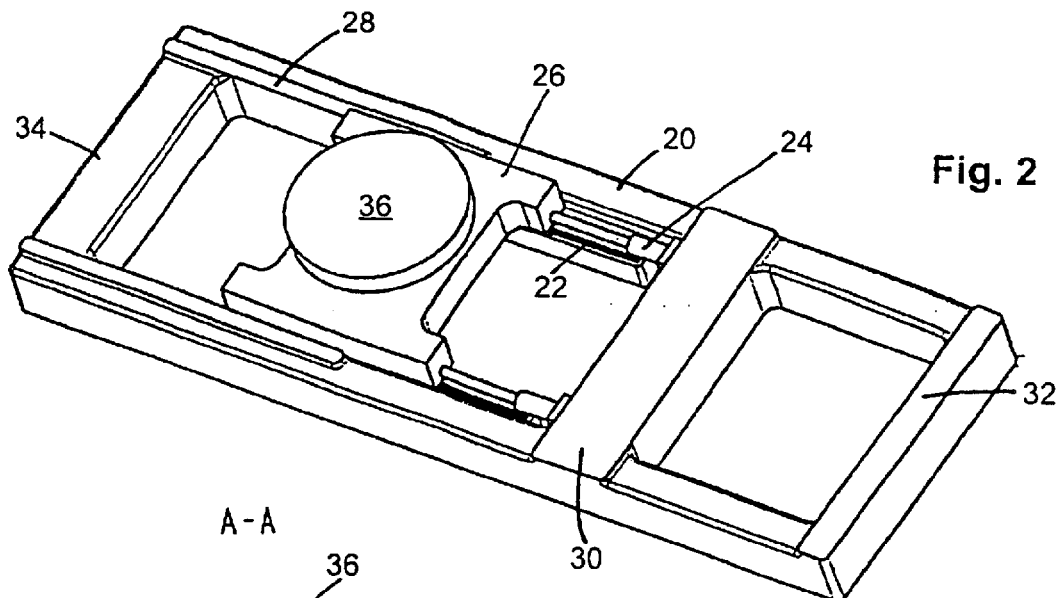
FIG. 2 is a perspective view of a module frame of the injection molding machine.
Figure 3:
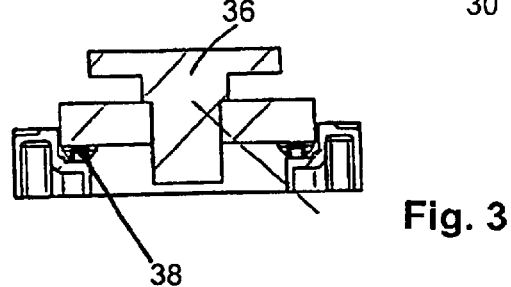
FIG. 3 is a sectional view of the modular frame, taken along the line III—III in FIG. 2.
Figure 6:
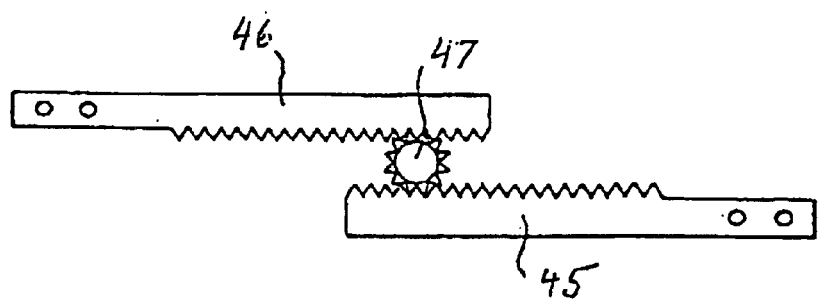
FIG. 6 is a schematic illustration of an exemplified drive for moving a base plate of the modular frame.

Turning to FIG. 2, there is shown a perspective view of the module frame 20, which includes parallel double-walled side portions 21 in spaced-apart relationship and a base plate 26 which travels in linear or sliding bearings 22 of the side portions 21. A hydraulic drive system including hydraulic cylinders 24 is provided to implement the displacement of the base plate 26. Of course, other types of drives are equally applicable for moving the base plate, such as, e.g., a spindle drive. Another alternative of a drive for moving the base plate 26 is shown in FIG. 6. The drive involved here is a rack and pinion mechanism and includes racks 45, 46 and a pinion 47. One of the racks 45, 46 is securely mounted to the module frame 20 and the other one of the racks 45, 46 is secured to the moveable mold mounting plate 4 and moveably received in a suitable guide. The pinion 47 is connected to the base plate 26 and meshes with the fixed and moving racks 45, 46. A rack and pinion mechanism of this type is described, for example, in International patent application no. WO 01/10624 A1 and operates in a manner that the moveable mold mounting plate 4 moves the base plate 26 about a distance which corresponds to half the movement path of the moveable mold mounting plate.

The base plate 26 carries a turntable 36, rotatably supported in suitable bearings 38 (FIG. 3), for attachment to the swivel plate 6. The turntable 36 has a pivot pin 37 which points downwards through the base plate 26. On its top surface, the module frame 20 is provided with slideways 28 for guiding the moveable mold mounting plate 4. A brace 30 extends across between the side portions 21 for receiving the fixed mold mounting plate 2. At the outer axial ends, the side portions 21 are interconnected by braces 32, 34 to close the module frame 20 to the outside and to provide an option to support a plate of a drive.

Figure 4:
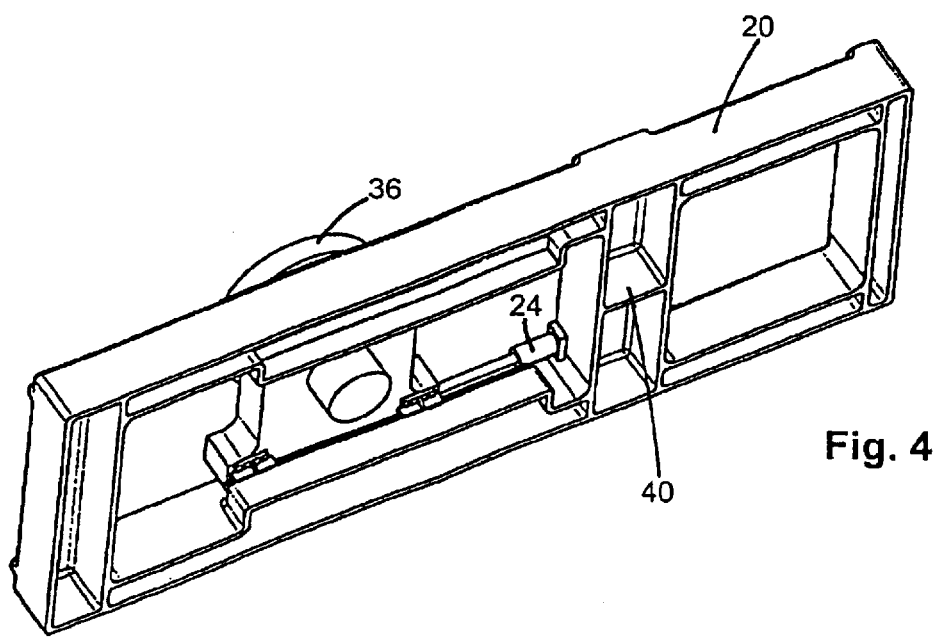
FIG. 4 is a bottom perspective view of the module frame.

As shown in particular in FIG. 4, the module frame 20 has a substantial hollow construction, whereby the brace 30 for supporting the fixed mold mounting plate 2 is reinforced from underneath by a crosspiece 40. Suitably, the module frame 20 is configured as cast part.

Figure 5:
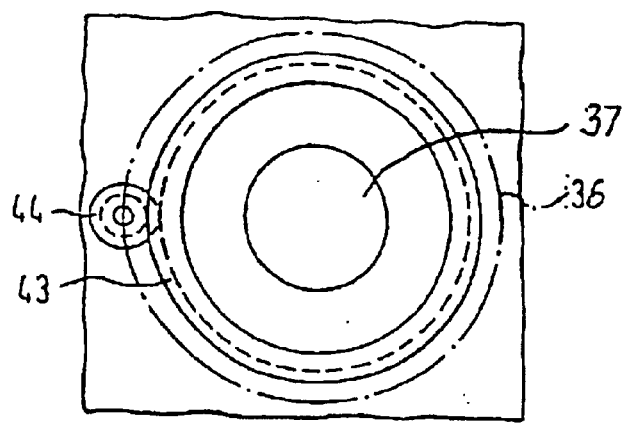
FIG. 5 is a schematic illustration of a drive mechanism for operating a turntable of the module frame.

Operation of the turntable 36 may be implemented by a suitable drive mechanism, as shown in FIG. 5. The drive mechanism includes a ring gear 43 mounted to the rotary table 36. The ring gear 43 is in mesh with a pinion 44 which can be driven by a hydraulic motor or electric motor (not shown). A specific construction and manner in which a drive mechanism can be operatively and functionally incorporated into the injection molding machine of the present invention is fully described in International publication WO 01/10624, the entire specification and drawings of which are expressly incorporated herein by reference.

A standard or conventional injection molding machine can easily be retrofitted with a modular frame 20 simply by detaching the drive, tie bars and the moveable mold mounting plate from the machine bed and placing the module frame 20 according to the present invention upon the machine bed. Subsequently, the drive, tie bars and the moveable mold mounting plate are mounted onto the module frame 20, without requiring any modifications to these components. Only the structural height of the conventional injection molding machine is affected by the incorporation of the module frame 20.

As shown in FIG. 2, the base plate 26 may be configured with recesses 48 so as to allow molded articles, removed from the swivel plate 6, to drop downwards through the intermediate space between the base plate 26 and the brace 30 or through the intermediate space between the base plate 26 and the brace 34.

Figure 7:
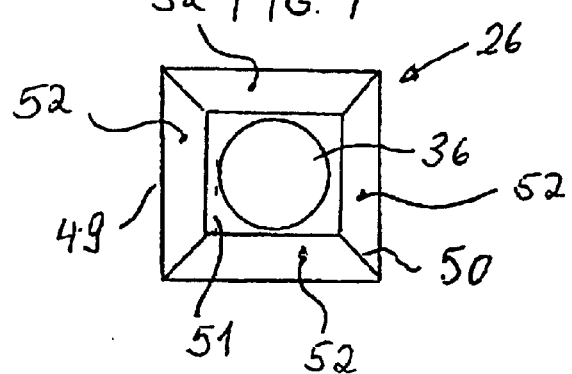
FIG. 7 is a schematic illustration of a variation of a base plate of the modular frame.

The base plate 26 may be configured as massive plate. Alternatively, the base plate 26 can have pockets 52 or may be configured as a framework construction. An example of a frame construction is shown in FIG. 7 and includes a circumferential frame 49 having struts 50 which extend from the corners of the frame 49 toward a hub 51 in the center of the frame 49, with pockets 52 provided between the hub 51 and the frame 49.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A rotary device for a horizontal injection molding machine; comprising:
   a module frame constructed for attachment to a machine bed of a horizontal injection molding machine;
   a base plate;
   a turntable rotatably mounted on the base plate;
   wherein the base plate with the turntable are mounted in the module frame for displacement.

2. The rotary device of claim 1, wherein the module frame includes guides for a moveable mold mounting plate.

3. The rotary device of claim 1, wherein the module frame includes a mounting structure for attachment of a fixed mold mounting plate.

4. The rotary device of claim 1, wherein the module frame includes a drive mechanism for displacement of the base plate.

5. The rotary device of claim 4, wherein the drive mechanism includes a hydraulic cylinder.

6. The rotary device of claim 4, wherein the drive mechanism includes a fixed rack securely mounted to the module frame, a moving rack secured to the moveable mold mounting plate, and a pinion connected to the base plate and meshing with the fixed and moving racks.

7. The rotary device of claim 1, wherein the base plate is formed as frame with pockets.

8. The rotary device of claim 1, wherein the module frame includes fastening means for securement to a machine bed of an injection molding machine.

9. A horizontal injection molding machine, comprising:
   a machine bed;
   a first mold mounting plate carrying a mold half;
   a second mold mounting plate adapted for traveling relative to the first mold mounting plate and carrying another mold half; and
   a rotary device including a modular frame adapted for placement on the machine bed and having a mounting structure for supporting the first mold mounting plate and a guide for supporting the second mold mounting plate, a base plate supported on the modular frame, and a turntable carrying a swivel plate between the first and second mold mounting plates and supported on the base plate for rotation about a vertical axis so as to turn the swivel plate.

10. The injection molding machine rotary device of claim 9, wherein the module frame includes a drive mechanism for displacement of the base plate.

11. The injection molding machine rotary device of claim 10, wherein the drive mechanism includes a hydraulic cylinder.

12. The injection molding machine of claim 10, wherein the drive mechanism includes a fixed rack securely mounted to the module frame, a moving rack secured to the moveable mold mounting plate, and a pinion connected to the base plate and meshing with the fixed and moving racks.

13. The injection molding machine of claim 9, wherein the base plate is formed as frame with pockets.

14. The injection molding machine of claim 9, wherein the module frame includes fastening means for securement to a machine bed of an injection molding machine.

15. A module frame for attachment to a machine bed of a horizontal injection molding machine, comprising:

a frame structure defining a longitudinal axis and having side portions and a plurality of braces in spaced-apart disposition between the side portions, with one of the braces supporting a fixed mold mounting plate of the injection molding machine, and with slideways along the side portions receiving a moveable mold mounting plate;

a base plate guided for displacement in the direction of the longitudinal axis in a bearing assembly provided in the side portions; and a turntable rotatably mounted on the base plate for supporting and turning a swivel plate disposed between the fixed and moveable mould mounting plates.

16. The module frame of claim 15, wherein the base plate is a massive plate.

17. The module frame of claim 15, wherein the base plate is a frame construction which includes a circumferential frame having struts extending from corners of the frame toward a central hub for support of the turntable.

18. The module frame of claim 15, wherein the frame structure is configured as cast part.

* * * * *